United States Patent
Levien et al.

(10) Patent No.: US 9,273,637 B2
(45) Date of Patent: Mar. 1, 2016

(54) ADJUSTMENT SAFEGUARD FOR A SET SCREW ON A CARBURETOR

(71) Applicant: Andreas Stihl AG & Co. KG, Waiblingen (DE)

(72) Inventors: Patrick Levien, Fellbach (DE); Achim Baumhauer, Schwaebisch Gmuend (DE); Walter Gernhard, Kernen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 128 days.

(21) Appl. No.: 14/035,645

(22) Filed: Sep. 24, 2013

(65) Prior Publication Data

US 2014/0093329 A1  Apr. 3, 2014

(30) Foreign Application Priority Data

Sep. 28, 2012 (DE) .......................... 10 2012 019 128

(51) Int. Cl.
| | |
|---|---|
| *F02M 3/08* | (2006.01) |
| *F02M 19/04* | (2006.01) |
| *F02M 3/10* | (2006.01) |
| *F16B 35/00* | (2006.01) |

(52) U.S. Cl.
CPC ................ *F02M 19/04* (2013.01); *F02M 3/08* (2013.01); *F02M 3/10* (2013.01); *F16B 35/005* (2013.01)

(58) Field of Classification Search
CPC ........................................................ F02M 3/08
USPC ............... 261/71, DIG. 38, DIG. 84; 137/382
See application file for complete search history.

(56) References Cited

U.S. PATENT DOCUMENTS

| | | | |
|---|---|---|---|
| 5,252,261 A | 10/1993 | Gerhardy | |
| 8,348,244 B2 * | 1/2013 | Kojima et al. | ................... 261/71 |

* cited by examiner

*Primary Examiner* — Robert A Hopkins
(74) *Attorney, Agent, or Firm* — Walter Ottesen P.A.

(57) ABSTRACT

An adjustment safeguard for a set screw on a carburetor includes a cap held non-rotatably on the head of the set screw. The cap is surrounded by a coaxially positioned wall sleeve fixed to the housing. A rotation stop is fixed to the housing to limit the angle of rotation of the cap in the sleeve in the rotational direction of the set screw. A through-opening in the cap permits inserting a tool into an engagement opening in the head of the set screw to avoid destruction by introducing too much torque into the adjustment safeguard. The form and opening width of the through-opening is limited by the use of a metal material such that a tool larger than the adjustment tool is not able to be inserted through the through-opening into the head of the set screw. The engagement opening is flexible to limit a maximum allowable adjustment torque.

15 Claims, 7 Drawing Sheets

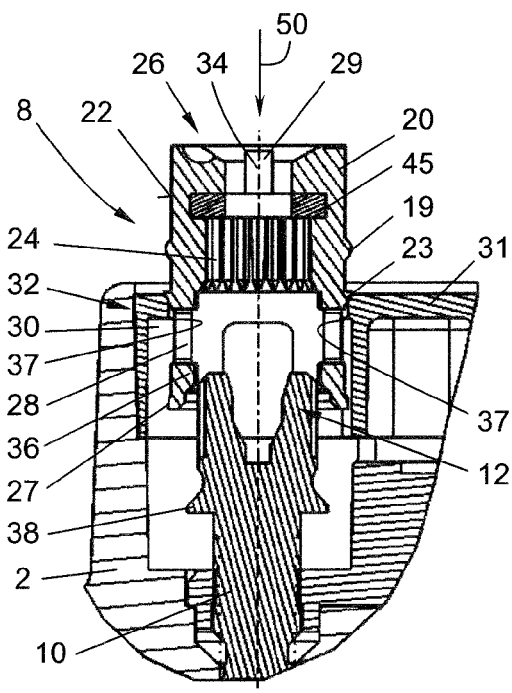
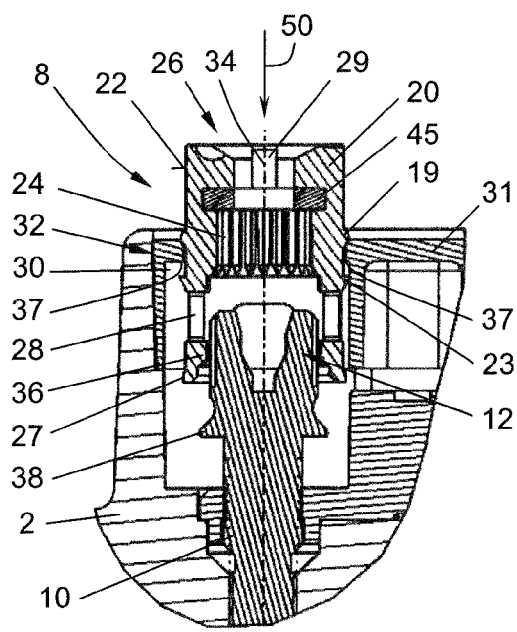
FIG. 11  FIG. 12
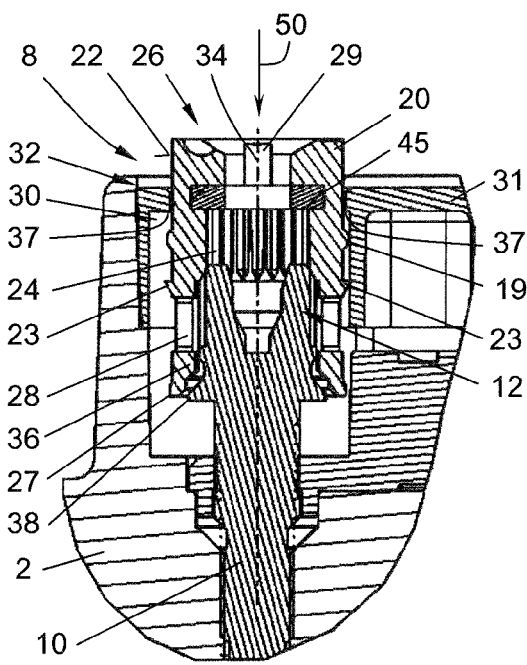
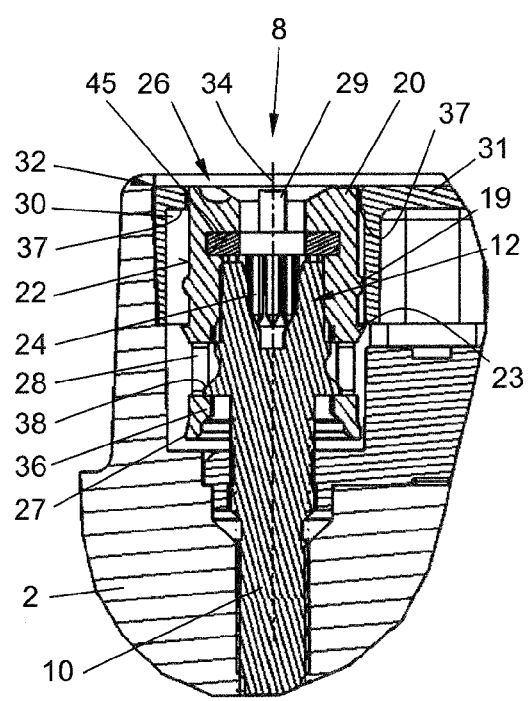
FIG. 13  FIG. 14

ADJUSTMENT SAFEGUARD FOR A SET SCREW ON A CARBURETOR

CROSS REFERENCE TO RELATED APPLICATION

This application claims priority of German patent application no. 10 2012 019 128.6, filed Sep. 28, 2012, the entire content of which is incorporated herein by reference.

BACKGROUND OF THE INVENTION

U.S. Pat. No. 5,252,261 discloses an adjustment safeguard for the set screw of a carburetor which consists of a cap held non-rotatably on the head of the set screw and is surrounded with minimum radial play by an approximately coaxially positioned wall sleeve fixed to the housing. The cap has associated therewith in the rotational direction of the set screw a stop in the wall sleeve which is fixed to the housing such that once the cap has been placed in position on the set screw, the user is only still able to adjust the set screw about a structurally fixed, limited angle of rotation. This ensures that once the carburetor has been preset during manufacture, the user is still only able to modify the preset settings within a limited range in which too rich a fuel setting and too poor a fuel setting are both prevented. Too rich a setting is negative for the exhaust while too poor a setting impairs the operating reliability of the internal combustion engine.

The cap of the adjustment safeguard is pressed onto the head of the set screw which has an outer knurling or toothing. A receiving space with an inner knurling or toothing is provided in a corresponding manner in the connecting portion of the cap such that it is only still possible to adjust the set screw together with the cap.

The adjustment safeguard itself is to be protected against manipulation by a user. The adjustment safeguard consequently has to be designed such that it is hardly possible for a user to destroy the limiting means of the adjustment range, even maliciously.

SUMMARY OF THE INVENTION

It is an object of the invention to provide an adjustment safeguard of the type described above wherein no adjustment torques which lie above a limit torque can be applied to the set screw. Adjustment torques which exceed the limit torque could otherwise destroy the adjustment safeguard.

The adjustment safeguard of the invention is for a set screw on a carburetor in a handheld work apparatus. The adjustment safeguard includes: the carburetor having a carburetor housing defining a wall; the set screw having a head and defining an engagement opening and the set screw being rotatable in a rotational direction; a cap configured to be held in a rotatably fixed manner on the head of the set screw and the cap being rotatable through a rotational angle (S); a wall sleeve fixed to the carburetor housing and configured to be coaxial with the cap and surround the cap with a slight radial clearance; a rotation stop fixed to the carburetor housing to limit the rotational angle (S) of the cap in the wall sleeve; the cap defining a through opening to the engagement opening; the through opening having a shape and an opening width which are delimited by a metallic material; and, the engagement opening being configured to be flexible in at least one of the shape and the opening width so as to limit a maximum allowable adjustment torque.

In the cap placed in position on the set screw, a through-opening to an engagement opening is realized in the head of the set screw such that once the cap has been pre-mounted, the set screw is adjustable during manufacture or in service using a suitable adjustment tool. The pre-mounted cap is just inserted into the wall sleeve and in this position is not yet non-rotatably connected to the set screw. The set screw, therefore, is able to be adjusted by means of the adjustment tool, which projects through the engagement opening, without limiting the adjustment range, the adjustment tool engaging in the engagement opening in the head of the set screw. The form and/or opening width of the engagement opening in the head of the set screw is developed in a flexible manner, in particular is developed in an elastically flexible manner, the elasticity being designed such that an adjustment moment to be introduced into the set screw through the engagement opening is clearly below the limit torque which destroys the stop. Thus, only a maximum admissible adjustment moment is able to be transmitted via the engagement opening in the head of the set screw.

Once the set screw, which can be the idle screw or the full-load screw of the carburetor, has been adjusted, the cap is pressed non-rotatably onto the head of the set screw such that the set screw is only still able to be rotated together with the cap, the angle of rotation in the wall sleeve being limited to an admissible adjustment range of less than 360°, for example being limited to approximately 270°.

The adjustment tool for the set screw has a diameter which is defined by the diameter of the through-opening. The adjustment moment to be applied by the adjustment tool is defined as a result; a maximum adjustment moment which can be applied by the adjustment tool is less than the limit torque which destroys the stop.

To prevent a user accessing the engagement opening in the head of the set screw using a larger tool, the form and opening width of the through-opening is limited by a metallic material. A larger tool can consequently not be used as the metal material prevents a tool being pushed through the through-opening, the diameter of the tool being greater than the through-opening.

The form and opening width of the through-opening is limited by a metal material. By designing the adjustment guard with a cap in this manner, access to the engagement opening in the head of the set screw using a non-adapted tool can be prevented. The adjustment safeguard is protected against too high an adjustment torque.

In a simple manner, the engagement opening provided in the head of the set screw for an adjustment tool is limited by walls which, when a maximum admissible adjustment torque is exceeded, deflect elastically or destructively in a radial manner and thus cause the adjustment tool to slip in the engagement opening of the set screw. In a practical manner, the walls defining the engagement opening can be divided by axial slots into one or several flexible wall sections.

In an advantageous manner, the engagement opening is realized in a disc which is produced from metal material and is held in a captive manner in the cap. In this case, the disc can be held non-rotatably in the cap or, should it be practical, can also be fixed rotatably in the material of the cap. The fixing of the disc in the cap is realized in a practical manner such that in the case of an overload, the disc rotates in relation to the cap. This consequently ensures that a torque, which is introduced by a tool only into the disc, is limited.

Pushing through the through-opening with a tool which is greater that the diameter of the through-opening is reliably prevented in a practical manner by the disc consisting of a metal such as steel.

In an advantageous manner, the through-opening has a circular cross section, in particular a circular transverse cross section and is realized in an expedient manner as a central opening in the disc. The circular design or round design prevents the introduction of a torque into the disc itself. Thus, by inserting a tool which cants in the through-opening, a torque which lies above a limit torque which destroys the stop of the adjustment guard is able to be prevented from being applied.

In order to make it possible for the user to adjust the set screw in a simple manner within the structurally provided limits, the cap is provided on the end of the through-opening remote from the set screw with cutouts for an adjustment tool. In an advantageous manner, the cutouts are located radially outside the through-opening, the disc expediently forming the bottom of the cutout. In a simple configuration, at least two cutouts, with reference to the through-opening, are located approximately diametrically opposite one another such that a simple engagement opening is formed for the blade of a screwdriver or the like. The development, in this case, is designed such that when an excessive torque is applied in the cap region above the disc, the cap material shears off above the disc, as a result of which the torque to be introduced is also limited.

By shaping the form of the cutouts and their position with respect to one another in an advantageous manner, for example in a star-shaped arrangement, the use of a special adjustment tool can be compelled. In this case, the adjustment tool itself can be realized such that it is only able to be used for applying torques which are below the limit torque which destroys the stop. This can be achieved, for example, by a structural weakening of the adjustment element or by the selection of a corresponding material.

In an advantageous manner, the cap itself is produced from plastics material, in particular from a hard plastics material. In a practical manner, the cap can also consist of a dimensionally stable, metal material such as zinc, magnesium, aluminum or the like.

It can be practical to realize the cap and the disc in an integral manner insofar as the material of the cap is selected such that it is dimensionally stable in order thus to limit the form and opening width of the through-opening in a rigid manner.

BRIEF DESCRIPTION OF THE DRAWINGS

The invention will now be described with reference to the drawings wherein:

FIG. 11 is a schematic section along the line in FIG. 2 with the non-mounted cap of the adjustment safeguard aligned to the set screw;

FIG. 12 is a schematic part section corresponding to FIG. 11 with the cap of the adjustment safeguard pre-mounted;

FIG. 13 is a schematic part section corresponding to FIG. 12 with the cap of the adjustment safeguard part-mounted on the head of the set screw; and, FIG. 14 is a schematic part section view corresponding to FIG. 13 with the cap of the adjustment safeguard non-rotatably mounted on the head of the set screw.

DESCRIPTION OF THE PREFERRED EMBODIMENTS OF THE INVENTION

Figure 1:
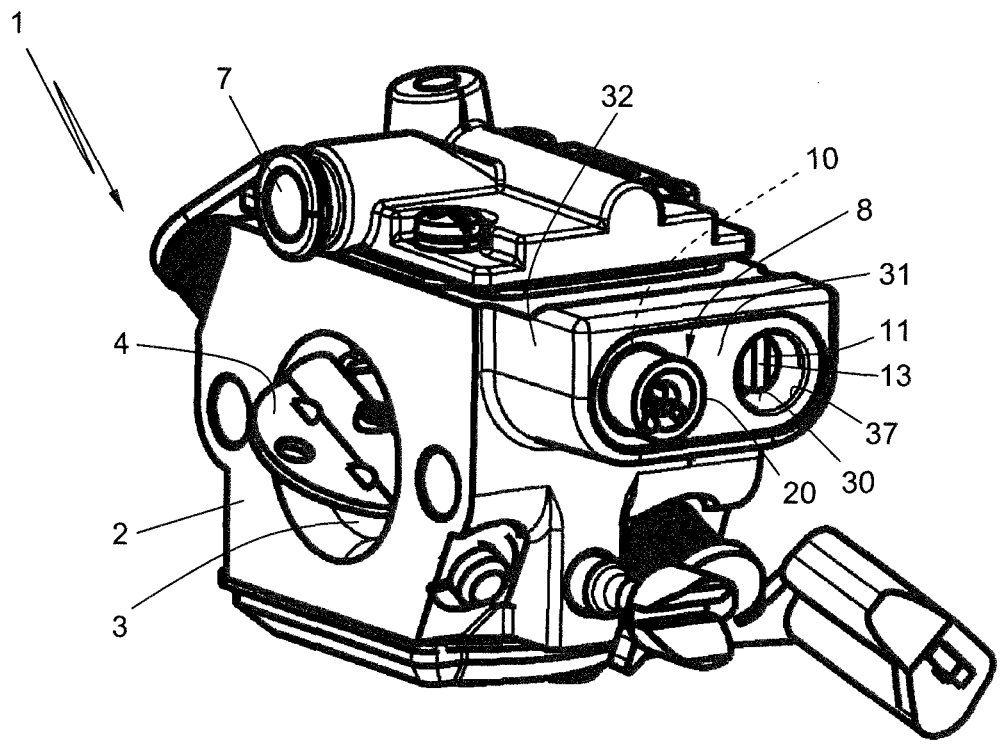
FIG. 1 is a perspective view of a diaphragm carburetor.
Figure 2:
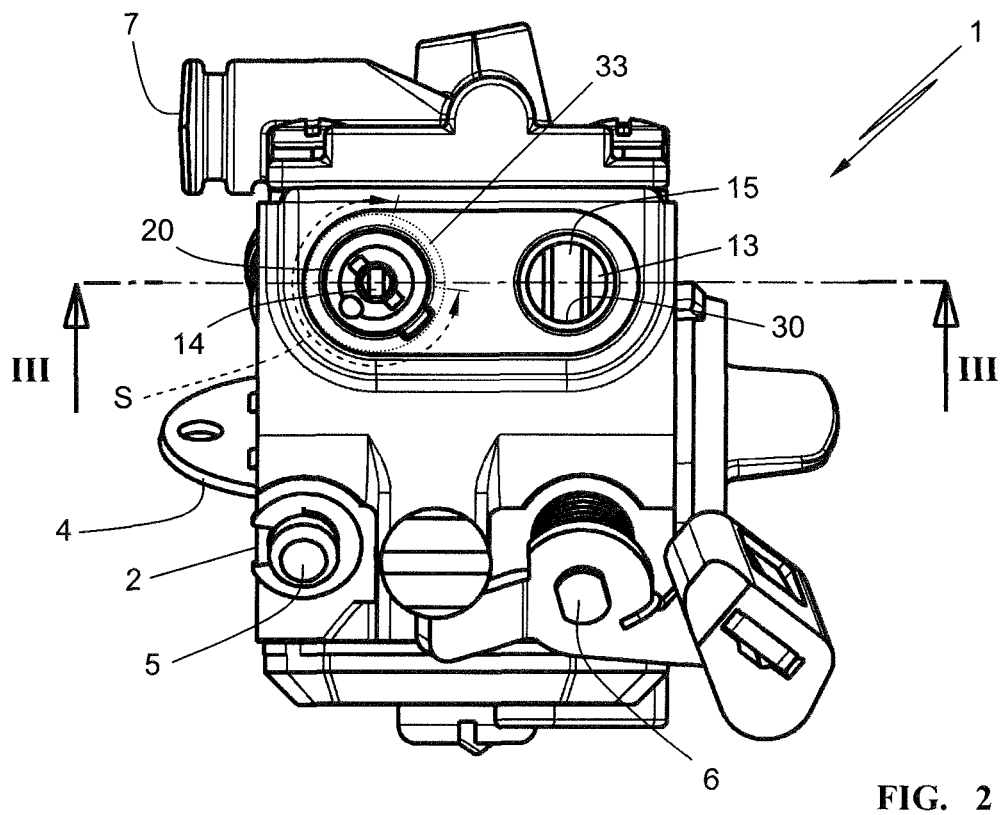
FIG. 2 is a side view of the diaphragm carburetor according to FIG. 1.

The carburetor 1 shown in FIGS. 1 and 2 comprises a carburetor housing 2 having an intake channel 3. A choke flap 4 is provided so as to be pivotable in the intake channel 3 as well as a throttle flap (not shown in more detail). The choke flap and throttle flap are rotatably mounted in the intake channel 3 by way of a choke flap shaft 5 and a throttle valve shaft 6. Fuel enters the intake channel 3 in a known manner via corresponding channels and nozzles and is supplied via a connection (not shown in any more detail) to the carburetor 1. The carburetor is a diaphragm carburetor in the embodiment shown. The connecting piece 7 is a compensator connection of the diaphragm carburetor.

Figure 3:
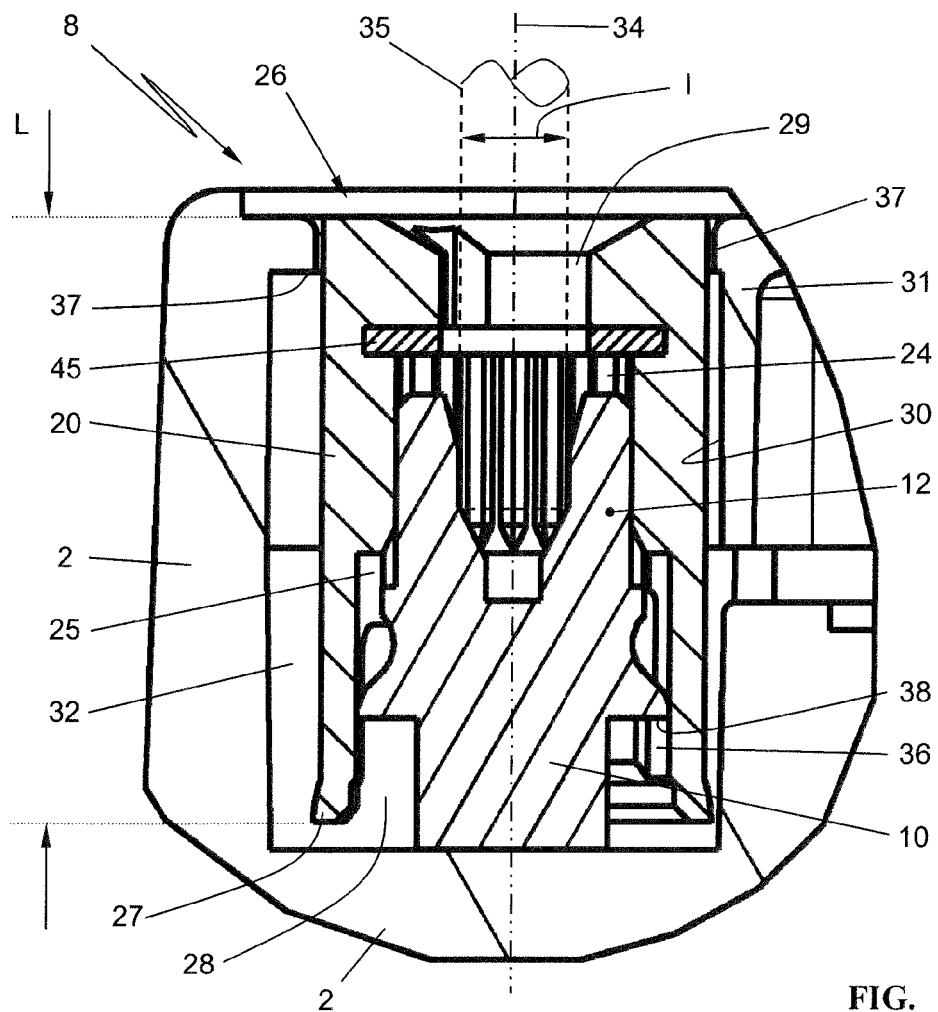
FIG. 3 is a part section through the carburetor housing along the line in FIG. 2.

Set screws (10, 11), as idle screw and full-load screw, regulate the cross sectional flow of an associated fuel channel in a manner not shown in any more detail and are provided for metering the fuel. Two set screws 10 and 11 are screwed into the carburetor housing 2 and the heads 12 (FIG. 3) and 13 (FIGS. 1, 2) thereof have an engagement opening (14, 15) (FIG. 2) for an adjustment tool 35 (FIG. 3).

In the embodiment shown, the heads 12 and 13 of the set screws 10 and 11 (idle screw, full-load screw) are located on one side of the carburetor housing 2 in a receiving space 32 (FIG. 1) which is connected fixedly to the carburetor housing 2. The walls of the receiving space 32 can be mounted fixedly on the carburetor housing 2 or can be realized integrally with the carburetor housing.

The receiving space 32 is closed off by an insert 31. Wall sleeves 30 are fixed to the housing and are configured in the insert 31.

Figure 4:
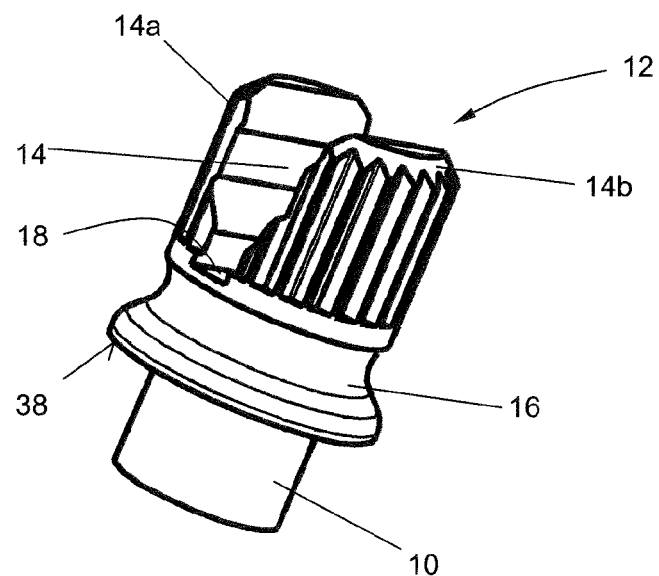
FIG. 4 is a perspective view of a head of a set screw.

The wall sleeves 30 define an opening into which a cap 20 of the adjustment safeguard 8 is axially inserted. As the section view in FIG. 3 shows, the cup-shaped cap 20 engages over the head 12 of the set screw 10 by way of a connecting portion 24; both the connecting portion 24 and the head 12 of the set screw 10 have a knurling or toothing (FIGS. 3, 4) by means of which a positive-latching, non-rotatable connection is produced between the cap 20 and the set screw 10.

In the mounted state of the cap 20 shown in FIGS. 3 and 14, the cap 20 is received over its entire axial length L in the receiving space 32 such that access to the set screw 10 is only still possible via the axial end face 26 of the cap 20 located in the wall sleeve 30.

Figure 5:
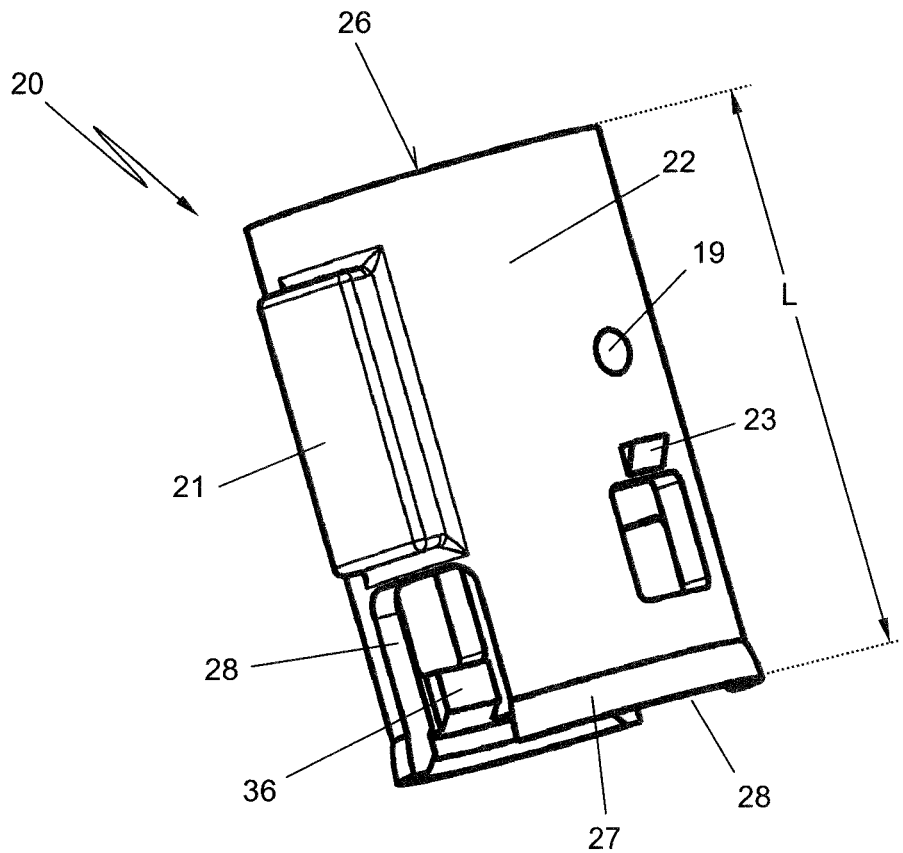
FIG. 5 is a perspective view of a cap of the adjustment safeguard.
Figure 6:
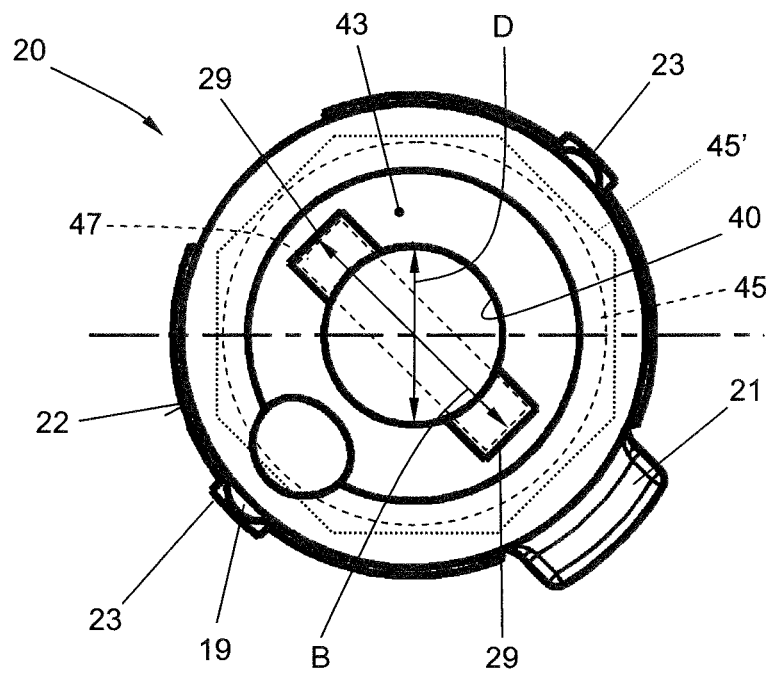
FIG. 6 shows a top view of the cap of the adjustment safeguard.
Figure 7:
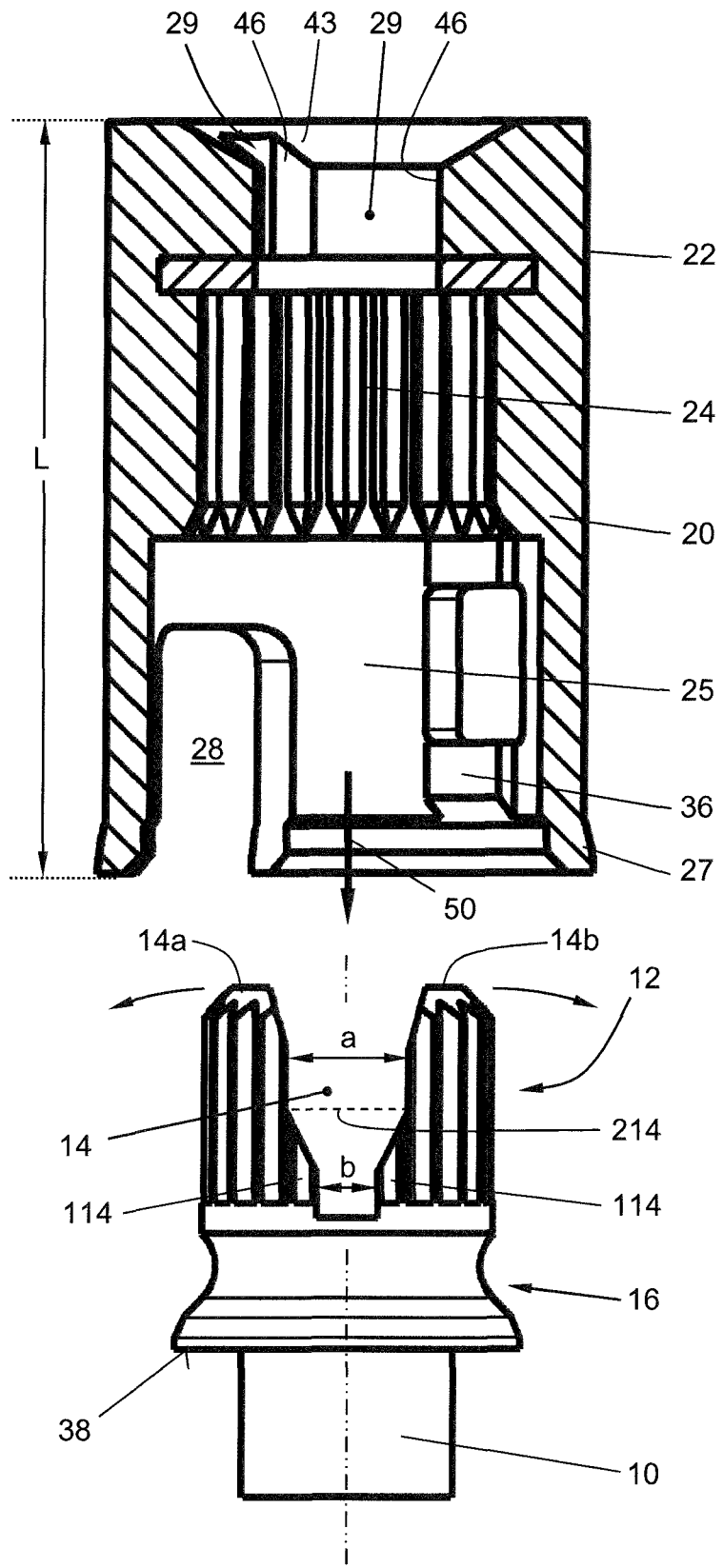
FIG. 7 is a schematic of the cap and of the set screw prior to the mounting procedure in the direction of the arrow.

The cap 20 has substantially a cylindrical, cup-shaped basic form, as is shown in FIGS. 5, 6 and 7. The toothed connecting portion 24 is located approximately in the upper half of the cylindrical cap 20, while in the bottom half of the cap 20, essentially a cavity 25 is realized in which, when the cap 20 is pressed onto the head 12 of the set screw 10, the bottom part 16 of the head is received.

On its outer periphery 22 (FIG. 5), the cap supports a shoulder 21 which extends radially away from the outer periphery 22. The shoulder 21 extends in the axial direction of the cap 20 over approximately half the height thereof and ends at a spacing in front of its upper end face 26. Latching knobs 19 and latching lugs 23, which interact with an edge 37 in the head region of the wall sleeve 30, are provided half way up the cap 20. In the embodiment shown, two latching knobs 19 and latching lugs 23, which are diametrically opposite one another, are provided on the outer periphery 22 of the cap 20.

For mounting the adjustment safeguard 8, the receiving space 32 is first of all closed by the insert 31, the insert 31 latching with the wall of the receiving space 32 in such a manner that the only way to remove it is to destroy it. As a result, the insert 31 and consequently its wall sleeves 30 are connected to the carburetor housing 2 so as to be solid with the housing.

As shown in FIG. 3, the set screw 10 is located coaxially with respect to the longitudinal center axis 34 of the wall sleeve 30, the head 12 of the set screw 10 protruding axially into the wall sleeve 30. The cap 20 is then pushed so far into the wall sleeve 30 that essentially the latching lugs 23 (FIG. 5) move over the slightly inwardly pulled edge 37 of the wall sleeve 30 and consequently the cap 20 in the wall sleeve 30 is first of all held in a captive manner pre-mounted on the carburetor housing 2 (FIG. 12). In order to exclude, in a reliable manner, any engagement of the cap 20 with the head 12 of the set screw 10 in the pre-mounted position, further axial insertion of the cap 20 is prevented by the latching knobs 19. In the pre-mounted position of the cap 20, the edge 37 of the wall sleeve 30 is located between the latching lugs 23 and the latching knobs 19 (FIG. 12).

To obtain sufficient elasticity of the bottom edge of the cap 20, recesses 28, which are located opposite one another, are provided in the wall portions thereof. To make the bottom edge of the wall portions of the cap 20 more rigid, the edge is realized as thickened edge 27 which is flared slightly outward.

As can be seen in the top view in FIG. 6, a central through-opening 40, which lies aligned with respect to the longitudinal center axis 34 and enables access to the engagement opening 14, is provided in the cap 20. The diameter D (FIG. 6) of the through-opening 40 is smaller than the engagement opening 14 such that an adapted tool is easily able to be inserted into the head 12 of the set screw 10. The adjustment tool 35 in the embodiment shown is, for example, an Allen wrench or the like, the diameter I of which (FIG. 3) is less than the diameter D (FIG. 6) of the advantageously circular through-opening 40. The through-opening 40 is developed as a circle in the embodiment shown.

The through-opening 40 is configured in a disc 45 which is fixed in the material of the cap 20. The disc 45 is advantageously injection molded into the material of the cap 20.

The disc 45 consists of a dimensionally stable, metal material and is held in a captive manner, in particular non-rotatably, in the cap 20. It can be practical for the disc 45 to be held rotatably in the cap 20.

In the embodiment shown, the through-opening 40 is realized as a central circular opening in the round disc 45; it can also be expedient to realize the disc as a polygon 45' (FIG. 6), as an elliptical disc or a disc with a similar spatial configuration. The advantage of a disc 45 which deviates from the circular form is that after being poured or injection molded into the cap, the disc is secured non-rotatably in the cap as a result of its form.

Figure 8:
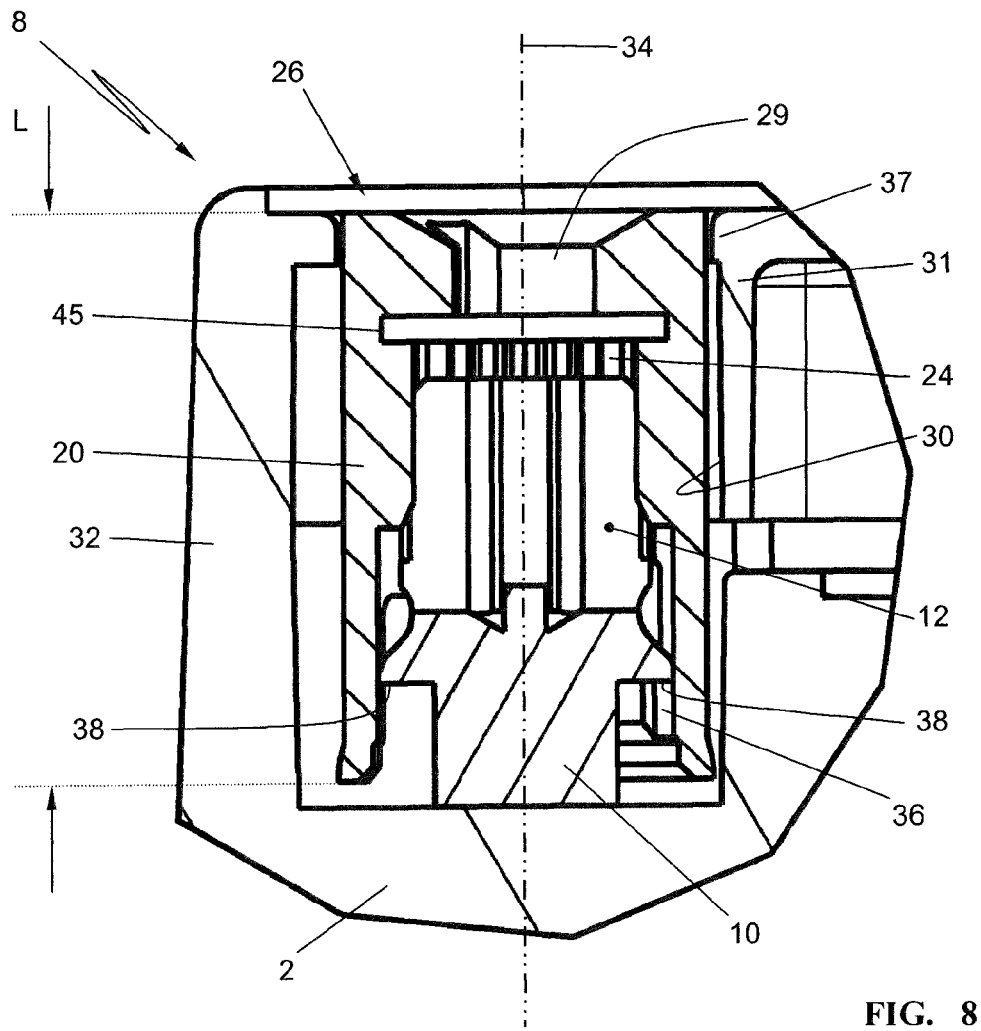
FIG. 8 shows a part section through the carburetor housing of FIG. 3 of an adjustment safeguard in another embodiment.

The cap 20, which is axially prefixed by engaging behind the edge 37 in the wall sleeve 30 via the latching lugs 23 and the latching knobs 19, allows the set screw 10 to be rotated without any rotational movement of the cap 20; the set screw 10 and the cap 20 are not yet non-rotatably fixed to one another. Once the set screw 10 has been set properly for operation via the adjustment tool 35 in order to ensure the necessary supply of fuel to the intake channel 3, the cap 20, by overcoming the resistance of the latching knobs 19, is pressed onto the head 12 of the set screw 10 in the direction of the arrow 50 (FIGS. 7, 13 and 14) until the latching lugs 36 engage behind the edge 38 of the head 12 of the set screw 10 and the cap 20 is thus secured in an axially positive-locking manner on the set screw 10 in its mounted position (FIGS. 3, 8, 14).

The wall sleeve 30 surrounds the cap 20, which is located therein, with minimum radial play. The wall sleeve 30 has a counter stop 33 (FIG. 2) which interacts with the shoulder 21 of the cap 20. As shown in FIG. 2, the counter stop 33 is located in the rotational path of the shoulder 21 such that the cap, which is pushed onto the head 12 of the set screw 10, is only still adjustable over a limited angle of rotation S. Such an angle of rotation S can be, for example, approximately between 200° and 280°. If a smaller angle of rotation S is to be realized, the counter stop 33 in the wall sleeve 30 can be configured so as to be longer in the peripheral direction. The wall sleeve 30 is configured with its counter stop 33 on the insert 31. For this reason, adaptively configured inserts 31 can be latched to the carburetor housing 2 depending on the design of the carburetor.

If a user of, for example, a motor chainsaw wants to modify the settings of the carburetor installed therein, the user is only still able to do this within the range of the setting path S. Recesses 29 are provided for this purpose in the end face 26 of the cap. In the embodiment shown, two recesses 29 lying diametrically opposite one another with reference to the through-opening 40 are provided. The recesses 29—as shown in FIG. 3—are located on the side of the disc 45 facing away from the set screw 10.

The user can place a screwdriver or similar tool into the end face 26, the blade 47 of the screwdriver being received in the recesses 29 of the cap 20 (FIG. 6). Since, as shown for example in FIG. 7, an indentation 43 is provided in the manner of a truncated cone in the end face 26, the height of the flanks 46 of the recesses 29 is preset in a structural manner. In this case, the design is such that only a limited torque is able to be applied using a screwdriver. The torque, which is to be applied in a limited manner, is less than the moment of resistance which is able to be developed non-destructively by impacting the shoulder 21 against the counter stop 33 in the wall sleeve.

The width B of a screwdriver blade 47 is preset by the depth of the recesses 29; access to adjust the set screw 10 is denied to wider blades.

Breaking through with the screwdriver blade 47 is not easily possible because the disc 45 is made from a dimensionally stable, metal material which fixes the form and the opening width of the through-opening 40, that is, the diameter D, in a structurally rigid manner. The disc 45 is preferably of a metal such as steel or spring steel such that a high moment of resistance against penetration to the head 12 of the set screw is provided.

Even using the adjustment tool 35, which cooperates with the head 12 of the set screw 10 after passing through the through-opening 40, the limit of the rotational path S provided by the shoulder 21 and the counter stop 33 cannot be overcome. The structural size of the adjustment tool 35 initially ensures that no large torques are able to be applied. Furthermore, the head 12 of the set screw 10 is realized in such a manner that its form and/or opening width is modified elastically or destructively when a limit torque is applied. In the embodiment shown, modification is ensured as a result of the walls (14a, 14b), which delimit the engagement opening 14 in the head 12 of the set screw 10, deflecting elastically in a radial manner such that an adjustment tool 35 slips in the engagement opening 14. A destructive action can be provided from a certain elastic deformation such that the form and/or opening width of the engagement opening 14 is permanently destroyed.

When the mounting of the adjustment safeguard 8 is completed, that is, the cap 20 is pressed axially on the head 12 of the set screw 10 into the wall sleeve 30 and is latched by the inner latching lugs 36 on the head 12 of the set screw 10, it is only still possible to adjust the set screw 10 within the range of the setting path S which is structurally preset by means of the shoulder 21 on the cap 20 and the counter stop 33 in the wall sleeve 30. The shoulder 21 shearing off from the cap 20 due to the application of a large torque is counteracted by structural measures:

- As a result of the size of the through-opening 40 in the disc 45, only an adjustment tool 35, the diameter I of which is defined, is insertable into the engagement opening 14 of the set screw 10 (FIG. 3).
- The torque that is able to be applied to the set screw 10 by the adjustment tool 35 is defined by the structural configuration of the head 12; if a limit moment is exceeded, the walls (14a, 14b), which delimit the engagement opening 14 deflect elastically or destructively in a radial manner such that the adjustment tool slips in the engagement opening 14 (FIG. 7).
- The use of a large tool to apply greater adjustment torque is not possible as the disc 45, in a structural manner, blocks the insertion of larger tools into the engagement opening 14 of the set screw 10 (FIG. 3).
- Overcoming the access block to the engagement opening 14 in the head 12 of the set screw provided by the disc 45 is only possible with difficulty because the disc 45 is made from a metal material, in particular from steel.
- Adjusting the set screw by rotating the cap 20 is possible by means of a tool which is inserted into corresponding recesses 29 in the end face 26 of the cap 20; because of the size of the recesses and the form of the end face 26 (conical countersink), only a limited torque can be applied to the set screw 10 via the cap 20 using a screwdriver (FIG. 6).

All these measures ensure that shearing off the shoulder 21 in an arbitrary manner by applying a large torque is substantially prevented such that the structurally permissible angle of rotation S of a setscrew is not able to be departed from.

In the embodiment, the cap is advantageously produced from a plastics material; other suitable dimensionally stable materials are also able to be used, in particular metal material such as zinc, magnesium, aluminum or similar material.

Figure 10:
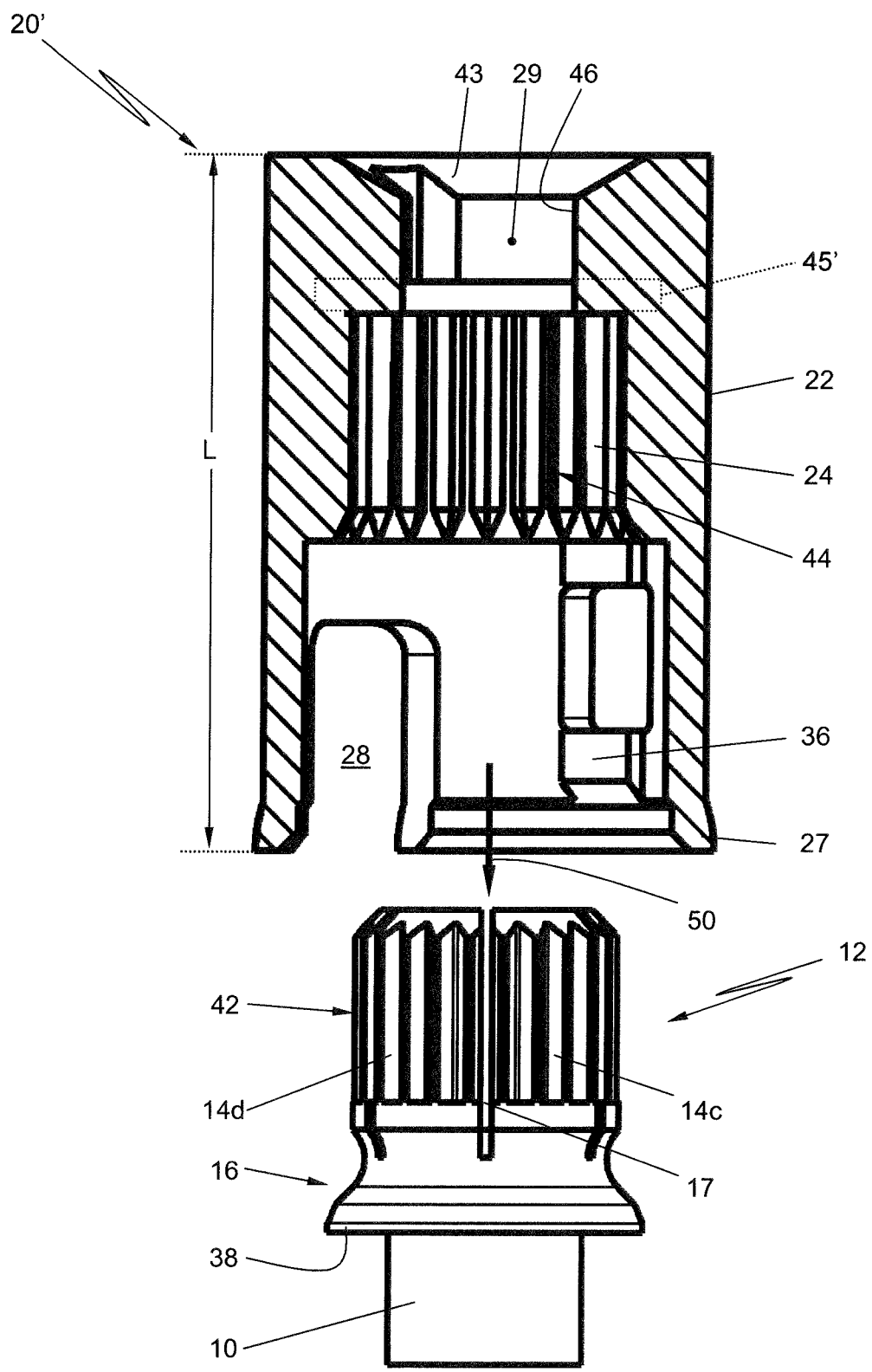
FIG. 10 is a schematic of a further embodiment of a cap and of a set screw prior to joining the adjustment safeguard together.

If a dimensionally stable, durable material is used for the cap 20, it can be practical to configure the cap 20 and the disc 45 in an integral manner (FIG. 10).

Figure 9:
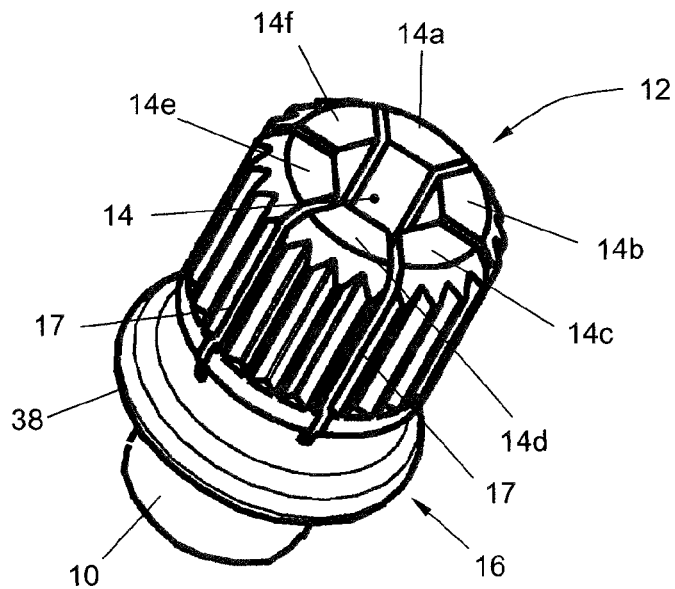
FIG. 9 is a perspective view of a head of a set screw in another embodiment.

The embodiment shown in FIGS. 8 and 9 differs from the first embodiment by the head 12 of the set screw 10 being designed in another manner. The engagement opening 14 is provided for the engagement of an Allen wrench or the like and the wall of the engagement opening 14 is divided by engagement slots 18 into wall portions 14a to 14f. If a torque which is above a limit value is applied to the set screw 10, the wall portions 14a to 14f deflect elastically or destructively in a radial manner and the engaging key slips in the engagement opening 14. A limit of the maximum permissible torque on the set screw 10 is achieved in a structural manner.

FIG. 8 illustrates the mounting of the cap 20 onto the head 12 of the set screw 10 according to FIG. 9 and its installed position in the carburetor housing 2. Identical parts are provided with the identical references as in FIG. 3.

The embodiment of FIG. 10 shows a cap 20' where the disc 45', indicated by the broken line, is realized integrally with the material of the cap 20'. The cap 20' is—as indicated by the arrow 50—pressed onto the head 12 of the set screw 10, the outer toothing 42 of the head 12 meshing in a positive-locking manner with the inner toothing 44 of the inner connecting portion 24. The set screw 10 can thus only be rotated together with the cap 20', the cap 20' having a shoulder 21 which protrudes on the outer periphery 22, as shown in FIG. 5.

FIGS. 11 to 14 show the use of the cap 20 with an adjustment safeguard 8 from the pre-mounting procedure (FIGS. 11, 12) to the final mounting procedure (FIG. 14). Identical references have been used for identical parts as in the preceding embodiments 1 to 10.

In the pre-mounting procedure, once the set screws 10 or 11 have been screwed in, the receiving space 32 of the carburetor 2 is closed by the insert 31, the head of a set screw 10 coming to rest in the wall sleeve 30 which is realized in the insert 31. The insert 31 is fixed in the receiving space 32 of the carburetor in such a manner that it is only possible to remove the insert 31 by destroying the insert.

In addition, the wall sleeve 30 is closed by the cap 20 in the pre-mounting procedure, the cap 20 being pressed in the direction of the arrow 50 into the wall sleeve 30 just until the latching lug 23 of the cap 20 moves over the upper edge 37 of the receiving sleeve in a latching manner. The latching knobs 19 first of all prevent the cap 20 penetrating deeper into the wall sleeve such that, in the pre-mounted position according to FIG. 12, the edge 37 of the wall sleeve 30 lies trapped axially between the latching lug 23 and the latching knobs 19 of the cap 20. On the one hand, the cap 20 is held in a captive manner axially; on the other hand the knobs 19 prevent the cap 20 from entering further axially into the wall sleeve 30.

In the pre-mounted position according to FIG. 12, the set screw 10 can be rotated independently of the cap 20 since the knurling of the head 12 of the set screw 10 is not yet in engagement with the knurling in the connecting portion 24 of the cap 20. In the pre-mounted position of the cap 20, the set screw 10 consequently can be set according to requirement in the factory. In the case of the setting, the cap 20 and the set screw 10 are separated from one another.

Once the setting of the set screw 10 has been completed and during the further mounting procedure, the cap 20 is pressed in the direction of the arrow 50 deeper into the wall sleeve 30 (FIG. 13), with the latching resistance of the knobs 19 having to be first overcome so that the knobs move over the edge 37. Once the latching knobs 19 have moved over the upper edge 37, the head 12 passes into the connecting portion 24 of the cap 20, the knurling of the head 12 and the knurling of the connecting portion 24 moving into engagement with one another so as to be non-rotatable. The cap 20 is pressed in further in the direction of the arrow 50 until it has reached the setting according to FIG. 14.

In the end position of the cap 20 of the adjustment safeguard 8 of FIG. 14, the inner latching lugs 36 engage behind the edge 38 of set screw 10 and latch behind the edge. Cap 20 is connected to set screw 10 in an axially captive manner; a non-rotatable coupling between cap 20 and set screw 10 is ensured by the knurling between the head 12 and the connecting portion 24.

As shown in FIG. 7, the wall sections (14a, 14b) each have thickened lower sections 114. The wall sections (14a, 14b) are configured to be connected to the set screw via the thickened lower sections 114 thereof and these wall sections 114 yield radially when the adjusting torque exceeds the maximum permissible value. The lower sections 114 constructively delimit the engagement or insertion depth 214 of the set tool 35. The two diametrically opposite wall sections (14a, 14b) conjointly define a distance (a) therebetween. The lower sections of the two diametrically opposite wall sections conjointly define a distance (b) between each other. The distance (a) being greater than the distance (b).

It is understood that the foregoing description is that of the preferred embodiments of the invention and that various changes and modifications may be made thereto without departing from the spirit and scope of the invention as defined in the appended claims.

What is claimed is:

1. An adjustment safeguard for a set screw on a carburetor in a handheld work apparatus comprising:
   said carburetor having a carburetor housing defining a wall;
   said set screw having a head and defining an engagement opening and said set screw being rotatable in a rotational direction;
   a cap configured to be held in a rotatably fixed manner on said head of said set screw and said cap being rotatable through a rotational angle (S);
   said cap being made of plastic;
   a wall sleeve fixed to said carburetor housing and configured to be coaxial with said cap and surround said cap with a slight radial clearance;
   a rotation stop fixed to said carburetor housing to limit said rotational angle (S) of said cap in said wall sleeve;
   said cap defining a through opening to permit access to said engagement opening of said set screw;
   a disc made of said metallic material and said through opening being formed in said disc;
   said disc being held in said cap so as to be inseparable therefrom;
   said through opening having a shape and an opening width which are delimited by said disc; and,
   said engagement opening being configured to be flexible or yieldable in at least one of said shape and said opening width so as to limit a maximum allowable adjustment torque.

2. The adjustment safeguard of claim 1, wherein said engagement opening is adapted to receive an adjustment tool for adjusting said set screw by applying an adjusting torque thereto; said cap includes a plurality of wall sections delimiting said engagement opening; and, said wall sections are configured to yield radially when said adjusting torque exceeds a maximum permissible value thereof.

3. The adjustment safeguard of claim 1, wherein said engagement opening is adapted to receive an adjustment tool for adjusting said set screw by applying an adjusting torque thereto; said cap includes a wall delimiting said engagement opening; and, said wall is partitioned into a plurality of wall sections by axial slits in said wall and said wall sections are configured to yield radially when said adjusting torque exceeds a maximum permissible value thereof.

4. The adjustment safeguard of claim 1, wherein said disc is held in said cap so as not to be rotatable relative thereto.

5. The adjustment safeguard of claim 1, wherein said disc is made of steel.

6. The adjustment safeguard of claim 1, wherein said through opening is a central opening.

7. The adjustment safeguard of claim 6, wherein said central opening has a circular cross section.

8. The adjustment safeguard of claim 1, wherein said engagement opening is adapted to receive an adjustment tool for adjusting said set screw by applying an adjusting torque thereto; and, said cap has an end of said through opening facing away from said set screw with said end having cutouts formed therein for accommodating said adjustment tool.

9. The adjustment safeguard of claim 8, wherein said cutouts lie radially outside of said through opening when said through opening is viewed in plan.

10. The adjustment safeguard of claim 8, wherein said cutouts are at least two in number lying opposite each other.

11. The adjustment safeguard of claim 1, wherein said carburetor is a membrane carburetor.

12. The adjustment safeguard of claim 11, wherein said handheld work apparatus is a motor-driven chain saw.

13. The adjustment safeguard of claim 2, wherein said wall sections each have thickened lower sections; and, said wall sections are configured to be connected to said set screw via said thickened lower sections; and, said wall sections are configured to yield radially when said adjusting torque exceeds said maximum permissible value.

14. The adjustment safeguard of claim 13, wherein two diametrically opposite ones of said wall sections conjointly define a distance (a) therebetween and said lower sections of said two diametrically opposite ones of said wall sections conjointly define a distance (b) between each other; and, said distance (a) is greater than said distance (b).

15. The adjustment safeguard of claim 13, wherein said lower sections delimit an engaging depth for the adjustment tool.

* * * * *